3,379,802
Patented Apr. 23, 1968

3,379,802
FOAMED OLEFIN COPOLYMER BLENDS
Charles F. Raley and Richard E. Skochdopole, Midland, Mich., assignors to The Dow Chemical Company, Midland, Mich., a corporation of Delaware
No Drawing. Filed Nov. 4, 1964, Ser. No. 408,727
15 Claims. (Cl. 264—53)

ABSTRACT OF THE DISCLOSURE

A flexible cellular product having resistance to oxidation and the effects of weather and improved stability to light is produced by passing a mixture of (1) a blend of an olefin polymer having a relative crystallinity of at least 30 percent and a high molecular weight saturated elastomer of at least one monoolefin and (2) a volatile organic foaming agent from a zone of elevated temperature and pressure to a zone of lower pressure, such as could occur during extrusion, to cause the mixture to expand and form the cellular product.

---

This invention relates to a process for producing cellular olefin copolymer materials. More particularly it relates to a method for producing cellular olefin copolymer bodies having excellent strength and improved flexibility.

In preparing cellular masses from thermoplastic resins, it is common practice to incorporate in the material to be foamed a solid blowing agent which, under the influence of heat, evolves gas, thus causing the formation of numerous cells which impart low density to the finished product. It is known to incorporate a gas or volatile organic liquid with a thermoplastic resin and heat the latter to a temperature at which it becomes plastic whereby vapors of the gas or volatile liquid expand the softened resin to form a cellular mass.

U.S. Patent 3,067,147 teaches a method for making cellular polyethylene by placing the molten polymer under pressure of 1,2-dichlorotetrafluoroethane blowing agent such as by heating the materials in admixture with one another under pressure to obtain a flowable gel. The gel is extruded into a zone of lower pressure to cause the extruded polymer to expand with the resultant formation of a cellular polymer body. The patent suggests that the polyethylene can be modified by blending with diene-type polymers.

In accordance with the present invention, flexible cellular masses and bodies are made from thermoplastic aliphatic olefin polymer blends by (1) admixing, as in an extruder, (a) an intimate physical blend of an aliphatic olefin polymer having a relative crystallinity of at least 30 percent and from about 5 percent to about 50 percent by weight based on the blend of a predominantly saturated unvulcanized elastomer derived from monoolefins, and (b) a volatile organic foaming agent, (2) subjecting the mixture to elevated temperatures and pressures and (3) passing said mixture to a zone of lower pressure to cause the material to expand and form a fine-celled polymer body.

In a preferred practice for making flexible cellular aliphatic olefin polymer bodies in a continuous manner, a blend consisting of a solid polymer of ethylene intimately mixed with a saturated elastomeric composition such as ethylene-propylene rubber is fed to a plastics extruder wherein it is heat-plastified and blended with a volatile organic blowing agent such as dichlorodifluoromethane under pressure of from about 300 p.s.i. to about 1500 p.s.i. to form a homogeneous flowable composition, which composition is brought to a substantially uniform temperature between about 70° and 180° C. throughout its mass and is thereafter extruded or discharged through a suitable orifice into a zone of lower pressure, e.g. the atmosphere, wherein the extruded material expands to form a flexible cellular body.

The thermoplastic aliphatic olefin polymer portion of the blend to be employed in practicing the present invention can be normally solid polymers obtained by polymerizing aliphatic monoolefins such as ethylene, propylene, butene-1, pentene-1, and the like, alone, with one another or with various other polymerizable compounds. It is preferred that polymers of ethylene be employed. Specific examples include polyethylene, copolymers of ethylene and vinyl acetate, ethylene and ethyl acrylate, ethylene and acrylic acid, ethylene and propylene (>70 percent ethylene), and the like. The aliphatic olefin polymer portion of the blend should have a relative crystallinity of at least 30 percent.

The elastomer portion of the polymer blend comprises predominately saturated uncured elastomers derived from monoolefins. The elastomers are characterized by having (1) high molecular weight, (2) a glass transition temperature below room temperature and (3) being essentially amorphous at room temperature. Examples include copolymers of ethylene with the following comonomers: other olefins, halovinyl compounds, vinyl esters, acrylic esters and the like. Specific examples include ethylene-propylene rubbers, polyisobutylene rubber, copolymers of isobutylene, chlorinated copolymers of isobutylene, chlorosulfonated polyethylene and the like. The preferred elastomers are ethylene-propylene rubber and polyisobutylene rubber which have particularly good compatibility with the preferred thermoplastics. The elastomer portion of the polymer blend is present in an amount from about 5 percent to about 50 percent and preferably from about 10 percent to about 30 percent by weight based on the weight of the polymer blend.

Copolymers such as ethylene and ethyl acrylate and ethylene and vinyl acetate, which may have a low enough modulus to produce a soft foam in the unmodified state, cannot be extruded alone to produce a satisfactory foam since the foams produced are dimensionally unstable and collapse upon extrusion. Some copolymers alone have been employed to produce stable foams; however, they are excessively stiff and inflexible. Where elastomers such as described above are mixed or blended with selected copolymers having the characteristics necessary to produce stable foams, it has been found that said foams also have the desired flexibility. It has been found that polymer blends employing diene-type elastomers do not satisfactorily produce the flexible foamed materials of this invention. Furthermore, foamed products made from polymer blends containing dienes have been found to have poor resistance to oxidation and are unstable to light and general weathering conditions.

Foaming agents found particularly useful in producing the foamed composition of the invention are volatile organic compounds such as dichlorodifluoromethane, 1,2-dichlorotetrafluoroethane, isobutane, methyl chloride, octafluorocyclobutane, 1,1,1-trifluoroethane, ethylidene fluoride, perfluoropropane, 2,2-difluoropropane, each alone or mixtures thereof and the like.

A prior art method for foaming polyethylene as disclosed by U.S. Patent 3,067,147 requires the use of 1,2-dichlorotetrafluoroethane as a foaming agent in order to obtain a desirable foamed composition. The present invention makes possible the use of a greater variety of foaming agents for a particular polymer composition because of the particular types of polymer blends employed.

The foaming agent can be employed in an amount from about 2 to about 60 parts and preferably from about 20 to about 40 parts per 100 parts by weight of the polymer-elastomer blend.

The invention provides an improved and economical method for making cellular masses from aliphatic olefin polymers, which cellular material is useful for a variety of purposes such as ski belts, life jacket inserts, seat cushions and the like. The products possess a highly uniform, fine-celled structure and are flexible, resilient, soft, lightweight materials. One of the most desirable properties of the foamed material is that it has softness approaching that of latex foam rubber yet has the processability and properties of a thermoplastic material. Although several methods for preparing foamed rubber compositions are known in the art, the foamed compositions collapse unless subjected to a curing step while in the foamed state. However, because of the thermoplastic nature of the composition of the present invention, the curing step is not necessary.

Finely divided solid materials such as calcium silicate, zinc stearate, magnesium stearate and the like can advantageously be incorporated with the polymer or gel prior to expanding the same. Such finely divided materials aid in controlling the size of the cells, and are employed in amounts of from 0.1 to 2 percent by weight of the polymer.

The following examples are illustrative of the invention and are not intended to limit the scope thereof.

Example 1

Into a 9 cc. glass ampoule were placed 3 grams of a polymer blend consisting of an intimate mixture of (1) 50 parts by weight of a copolymer of ethylene and 8 percent vinyl acetate, having a relative crystallinity of about 43 percent, (2) 50 parts of ethylene-propylene rubber (approximately 46 weight percent ethylene) and (3) 2 cc. of dichlorotetrafluoroethane. The ampoule was sealed and immersed in an oil bath and heated to a temperature of 140° C. for about two hours then equilibrated at 100° C. for about one hour. The ampoule was suddenly fractured allowing the polymer to foam. The foam was a soft, rubbery product having a specific volume of 24.2 cc./gm. after aging for three days.

Three additional tests were conducted using substantially the same procedure as above except that dichlorodifluoromethane, isobutane, and octafluorocyclobutane were substituted for the foaming agent in each test. The specific foam volumes were 10.3 cc./gm., 15.2 cc./gm. and 3.6 cc./gm. respectively.

In each of the tests conducted in a glass ampoule in the present and following examples, the amount of foaming agent employed was sufficient to incorporate a desired amount of foaming agent into the polymer and also to create autogenous pressures in the empty space of the ampoule.

The relative crystallinity of the thermoplastic portion of the polymer blend was determined by the X-ray diffraction method of Aggarwal and Tilley as described in the Journal of Polymer Science, vol. 18, pp. 17–26 (1955). The area under the symmetrical amorphous diffraction pattern of the above method for polyethylene is subtracted from the total area of the diffraction pattern of the crystalline polymer to obtain the percent relative crystallinity. For copolymers of the present invention, the amorphous diffraction pattern was first determined for the amorphous copolymer and the area of the amorphous diffraction pattern was subtracted from areas obtained for the crystalline copolymer. The resulting difference is stated to be the percent relative crystallinity for polymers and copolymers employed in the practice of the present invention.

Example 2

The procedure of Example 1 was substantially repeated except that polyisobutylene rubber was substituted for the ethylene-propylene rubber component. The resulting foamed product has a specific volume of 15.5 cc./gm.

Three additional tests were conducted using the same procedure as above except that other elastomeric compounds were substituted for the rubber component. The results are shown in Table I below.

TABLE I

| Elastomer | Oil Bath Temperature, °C. | Specific Volume, cc./gm. |
| --- | --- | --- |
| Chlorobutyl Rubber [1] | 100 | 22.0 |
| Chlorosulfonated Polyethylene [2] | 110 | 13.7 |

[1] Chlorinated copolymer of isoprene and isobutylene containing 1–2 moles of isoprene per 100 moles of isobutylene; 1.1–1.3 weight percent chlorine and molecular weight of 350,000 to 400,000.
[2] Contains 1.25 percent sulfur as sulfonyl chloride, about 29 percent chlorine and remainder polyethylene.

Example 3

The procedure of Example 1 was substantially repeated except that a copolymer of ethylene and 20 percent ethyl acrylate, having a 35 percent relative crystallinity, was substituted for the thermoplastic component and polyisobutylene rubber was substituted as the rubber component. A soft, resilient foam was produced having a specific volume of 21.9 cc./gm.

Three additional tests were conducted using the same procedure as above except that other elastomeric compounds were substituted for the rubber component. The results are shown in Table II below.

TABLE II

| Elastomer | Oil Bath Temperature, °C. | Specific Volume, cc./gm. |
| --- | --- | --- |
| Chlorobutyl Rubber [1] | 90 | 18.9 |
| Chlorosulfonated Polyethylene [2] | 90 | 19.6 |
| Butyl Rubber [3] | 90 | 6.7 |

[1,2] Same as notes 1 and 2 respectively of Table I.
[3] Copolymer of isoprene and isobutylene containing 1–1.4 moles of isoprene per 100 moles of isobutylene having a molecular weight of 350,000 to 400,000.

Example 4

The procedure of Example 3 was substantially repeated except that a mixture of 1 cc. of 1,2-dichlorotetrafluoroethane and 1 cc. of isobutane was substituted as the foaming agent. The foaming temperature was about 80° C. The soft rubbery foamed product had a specific volume of 36.7 cc./gm. after aging for one day.

Example 5

One hundred parts by weight of a polymer blend of 70 parts of polyethylene of M.I. 2 (about 65 percent relative crystallinity) and 30 parts of ethylene-propylene rubber was admixed with 34 parts of 1,2-dichlorotetrafluoroethane in a 1¼-inch screw extruder and extruded through a slit die at a rate of 7 pounds per hour and at a temperature of about 111° C. The gel was nucleated with a mixture of one part calcium silicate and two parts of zinc stearate per hundred parts of the polymer blend. The foamed product had an oval cross section of 1" x ⅝", a specific volume of 36.3 cc./gm. and had about 57 percent open cells.

Example 6

Into a 1¼-inch screw-type extruder was placed a polymer blend of 70 parts by weight of a copolymer of ethylene and 8 percent vinyl acetate, 30 parts of polyisobutylene rubber and 32 parts per 100 parts of polymer blend of 1,2-dichlorotetrafluoroethane foaming agent, the mixture being extruded at a rate of 7 pounds per hour and at a temperature of about 96° C. The foam had a small uniform cell structure and was a soft, flexible, resilient product. The specific volume was about 33.1 cc./gm. with about 46 percent open cells.

Example 7

Into an extruder similar to that employed in Example 6 was placed a polymer blend consisting of 65 parts by weight of a copolymer of ethylene and 20 percent ethyl acrylate, 35 parts of polyisobutylene rubber, and 21 parts of a mixture of 50 liquid volumes of 1,2-dichlortertafluoroethane and 50 liquid volumes of isobutane. The mixture was extruded at a rate of 7 pounds per hour and at a temperature of about 80° C. The foamed product had a specific volume of 21.3 cc./cm. and had 92 percent open cells.

Example 8

Into a 1¼-inch screw-type extruder was placed a polymer blend consisting of 60 parts by weight of a copolymer of ethylene and 8 percent vinyl acetate, 40 parts of chlorobutyl rubber and 33 parts of 1,2-dichlorotetrafluoroethane. The mixture was extruded at a rate of 7 pounds per hour and at a temperature of about 94° C. The foamed composition had a specific volume of 18.7 cc./gm. and had 77 percent open cells.

Example 9

Into a 2½-inch screw-type extruder was placed a polymer blend consisting of 90 parts by weight of a copolymer of ethylene and 8 percent vinyl acetate, 10 parts of ethylene-propylene rubber and 26.5 parts of 1,2-dichlorotetrafluoroethane. The mixture was extruded at a rate of 30 pounds per hour and at a gel temperature of about 89° C. The foam product had a specific volume of 31.8 cc./gm., a cell size of about 1.20 mm. in diameter and had 50 percent open cells. The compressive modulus at 25 percent deflection was 24 p.s.i. as determined by the MIL-P-T5280B test. The flexural index was 44 p.s.i.

The flexural index is a modification of the ASTM Method D-790-61 for determining the bending modulus of plastic materials. Since the ASTM method is used to test relatively hard and stiff materials, it could not be applied to the foamed materials of the present invention. Instead of suspending the material to be tested between two supports and placing the load in the center (ASTM method), an attachment was developed for an Instron Testing Machine whereby a bar of the foamed material resting on a conformable support is raised and forced, under pressure, to conform to the shape of an arcuate-shaped anvil located above the lower support. The pressure required to force a piece of foamed plastic eight inches long and of a convenient width and thickness, preferably 1" x 1", to conform to the shape of the anvil supplied the information necessary to draw a stress/strain curve. For the initial flat portion of the curve could be calculated a flexural modulus using a modification of the ASTM formula given in ASTM D-790-61. The formula for calculating the flexural index for a product of this invention is as follows:

$$\text{Flexural Index} = \frac{L}{D} \times \frac{S^3}{4Wh^{2.85}}$$

where $L$ = loads, lbs.
$D$ = deflection, in.
$W$ = width of sample, in.
$S$ = span, in.
$h$ = thickness of sample, in.

Example 10

Into a 2½-inch extruder was placed a polymer blend consisting of 70 parts by weight of a copolymer of ethylene and 8 percent vinyl acetate, 30 parts of ethylene-propylene rubber together with 24 parts of dichlorodifluoromethane. The mixture was extruded at the rate of 30 pounds per hour at a gel temperature of about 88° C. The foamed product had a specific volume of about 30.8 cc./gm., 94 percent open cells and a cell size of 1.5 mm. in diameter. The compresive modulus at 25 percent deflection was 6 p.s.i. and the flexural index was 40 p.s.i.

Example 11

Into a 2½-inch extruder was placed a polymer blend consisting of 90 parts by weight of polyethylene, 10 parts of ethylene-propylene rubber together with 24 parts of dichlorodifluoromethane. The mixture was extruded at a rate of 30 pounds per hour at a gel temperature of about 99° C. The foamed composition had a specific volume of 38.9 cc./gm., 51 percent open cells and a cell size of about 0.7 mm. in diameter. The compressive modulus at 25 percent deflection was 16 p.s.i. as determined by the MIL-P-T5280B test and the flexural index was 77 p.s.i.

Example 12

In a test not exemplary of the present invention 100 parts of high pressure polyethylene of M.I. 2 was mixed with 23 parts of 1,2-dichlorotetrafluoroethane in a 2½-inch screw-type extruder. The mixture was extruded at a rate of 30 pounds per hour and at a temperature of about 101° C. The resulting foamed product had a specific volume of 31.2 cc./g., 29 percent open cells and a cell size of 0.8 mm. in diameter. The compressive modulus was about 42 p.s.i. at 25 percent deflection as determined by the MIL-P-T5280B and the flexural index was 103 p.s.i. The tests show this foamed material to be much stiffer and less flexible than the composition of the present invention.

Example 13

In a test not exemplary of the present invention, 3 gm. of a blend of 50 parts of a copolymer of ethylene and 8 percent vinyl acetate and 50 parts of a copolymer of about 40 percent acrylonitrile and about 60 percent butadiene were placed in a 9 cc. glass ampoule together with 2 cc. of dichlorotetrafluoromethane. The sealed ampoule was heated as described in Example 1 and suddenly ruptured. The polymer failed to produce a foam.

An additional test was conducted as above except that a copolymer of ethylene and 20 percent ethyl acrylate was blended with the above-mentioned acrylonitrile-butadiene rubber in the same proportions. The resulting foam had a specific volume of 1.3 cc./gm., and was of a very non-homogeneous nature. The non-foamed copolymer blend has a specific volume of 1.1 cc./gm.

The above and other tests using non-blended polyethylene or polymers blended with dienes show the resulting foamed composition to have a higher flexural index, higher foam density and a higher compressive modulus. Although the foamed material of the present invention is softer and more flexible, tests show it to be as resilient as the non-blended polymer foam.

What is claimed is:

1. A process for producing flexible cellular bodies from thermoplastic aliphatic olefin polymer blends which comprises (1) placing, as in an extruder, a mixture of (a) an intimate physical blend of an aliphatic olefin polymer having a relative crystallinity of at least 30 percent and a high molecular weight saturated hydrocarbon elastomer consisting of at least one monoolefin, said elastomer being characterized by having a glass transition temperature below room temperature and being essentially amorphous at room temperature and (b) a volatile organic foaming agent, (2) subjecting said mixture to elevated temperature and pressure and (3) passing said mixture into a zone of lower pressure to cause the extruded material to expand and form a fine-celled polymer body.

2. The process according to claim 1 wherein the olefin polymer is a copolymer of ethylene and vinyl acetate.

3. The process according to claim 1 wherein the olefin polymer is a copolymer of ethylene and ethyl acrylate.

4. The process according to claim 1 where in the olefin polymer is polyethylene.

5. The process according to claim 1 wherein the volatile organic foaming agent is dichlorodifluoromethane.

6. The process according to claim 1 wherein the volatile organic foaming agent is a mixture of 1,2-dichlorotetrafluoroethane and methyl chloride.

7. The process according to claim 1 wherein the volatile organic foaming agent is isobutane.

8. The process according to claim 1 wherein the volatile organic foaming agent is a mixture of 1,2-dichlorotetrafluoroethane and dichlorodifluoromethane.

9. The process according to claim 1 wherein the volatile organic foaming agent is 1,2-dichlorotetrafluoroethane.

10. The process according to claim 1 wherein the elastomer portion is a copolymer of ethylene and propylene.

11. The process according to claim 1 wherein the elastomer portion is chlorosulfonated polyethylene.

12. The process according to claim 1 wherein the elastomer portion is a homopolymer of isobutylene.

13. The process according to claim 1 wherein the elastomer portion is present in an amount from about 5 percent to about 50 percent by weight based on the weight of the polymer blend.

14. A process for producing flexible cellular bodies from thermoplastic aliphatic olefin polymer blends which comprises placing in an extruder an intimate physical blend of (A) an olefin polymer selected from the group consisting of (1) copolymers of ethylene and vinyl acetate, (2) copolymers of ethylene and ethyl acrylate and (3) polyethylene, (B) an elastomeric copolymer of ethylene and propylene; and (C) 1,2-dichlorotetrafluoroethane; subjecting the mixture to pressures of from about 300 to about 1200 p.s.i. and temperatures of from about 80° C. to about 110° C. and extruding the mixture to the atmosphere to cause the extruded material to expand and form a fine-celled polymer body.

15. A process for producing flexible cellular bodies from thermoplastic aliphatic olefin polymer blends which comprises placing in an extruder an intimate physical blend of (A) an olefin polymer selected from the group consisting of (1) copolymers of ethylene and vinyl acetate, (2) copolymers of ethylene and ethyl acrylate and (3) polyethylene, (B) an elastomeric copolymer of ethylene and propylene; and (C) dichlorodifluoromethane; subjecting the mixture to pressures of from about 300 p.s.i. to about 1200 p.s.i. and temperatures of from about 80° C. to about 110° C. and extruding the mixture to the atmosphere to cause the extruded material to expand and form a fine-celled polymer body.

References Cited

UNITED STATES PATENTS

| 3,067,147 | 12/1962 | Rubens et al. | 264—53 X |
| 3,250,731 | 5/1966 | Buhl et al. | 260—25 |

FOREIGN PATENTS

| 664,843 | 6/1963 | Canada. |

ALEXANDER H. BRODMERKEL, *Primary Examiner.*

L. M. GARRETT, *Assistant Examiner.*